(12) United States Patent
Clemm et al.

(10) Patent No.: US 7,849,443 B2
(45) Date of Patent: Dec. 7, 2010

(54) METHOD AND APPARATUS FOR MANAGING SELECTIVE AND SUBTRACTIVE MERGES IN A SOFTWARE CONFIGURATION

(75) Inventors: Geoffrey M. Clemm, Concord, MA (US); Peter H. Klenk, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 11/610,150

(22) Filed: Dec. 13, 2006

(65) Prior Publication Data
US 2008/0148232 A1    Jun. 19, 2008

(51) Int. Cl.
G06F 9/44    (2006.01)
(52) U.S. Cl. .................................. 717/121; 717/122
(58) Field of Classification Search .................. 717/121, 717/122
See application file for complete search history.

(56) References Cited

U.S. PATENT DOCUMENTS

| | | | |
|---|---|---|---|
| 5,574,898 A * | 11/1996 | Leblang et al. ................... | 1/1 |
| 6,202,070 B1 | 3/2001 | Nguyen et al. | |
| 6,405,364 B1 | 6/2002 | Bowman-Amuah | |
| 6,754,885 B1 | 6/2004 | Dardinski et al. | |
| 7,299,450 B2 * | 11/2007 | Livshits et al. ............... | 717/121 |
| 7,703,027 B2 * | 4/2010 | Hsu et al. .................... | 715/763 |

OTHER PUBLICATIONS

Conradi et al., "Version Models for Software Configuration Management", Jun. 1998, ACM Computing Surveys (CSUR), vol. 30, Issue 2, pp. 232-282.*

Mehra et al., "A Generic Approach to Supporting Diagram Differencing and Merging for Collaborative Design", Nov. 2005,Proceedings of the 20th IEEE/ACM international Conference on Automated software engineering, pp. 204-213.*

Estublier et al., "Impact of Software Engineering Research on the Practice of Software Configuration Management", Oct. 2005, ACM Transaction of Software Engineering and Methodology, vol. 14, No. 4, pp. 383-430.*

Munson, J.P. and P. Dewan, "A Flexible Object Merging Framework," *Proceedings of the 1994 ACM Conference on Computer Supported Cooperative Work (CSCW)*, pp. 231-242 (1994).

Demeyer, S., et al., "Finding Refactorings via Change Metrics," *Proceedings of the 15th ACM SIGPLAN Conference on Object-Oriented Programming, Systems, Languages and Applications (OOPSLA)*, pp. 166-177 (2000).

* cited by examiner

*Primary Examiner*—Wei Y Zhen
*Assistant Examiner*—Chih-Ching Chow
(74) *Attorney, Agent, or Firm*—Hamilton, Brook, Smith & Reynolds, P.C.

(57) ABSTRACT

Method and apparatus for managing software configurations include a version history member representing changes between versions of artifacts forming different configurations of a subject software program. Indicated in version history member is any selective merge between artifact versions. Also indicated in the version history member is any subtractive merge between artifact versions. A selective merge arc and a subtractive merge arc are respective examples.

9 Claims, 10 Drawing Sheets

METHOD AND APPARATUS FOR MANAGING SELECTIVE AND SUBTRACTIVE MERGES IN A SOFTWARE CONFIGURATION

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software configuration management system is one such tool. Software configuration management systems allow teams of users (software developer/engineer) to work with artifacts of a subject software system.

A software artifact is a persistent representation of an aspect of a software system. Common examples of software artifacts are files and directories containing the source code of a software system, but other examples of artifacts include requirements, end-user documentation, system models, and system tests. A significant state of a software artifact is saved as a version of that artifacts and the sets of versions of a given artifact define the history of that artifact.

A software configuration is a set of software artifact versions, where only one version of a given artifact is selected by a given software configuration. A change-set identifies a logical change to a configuration, and consists of a set of one or more changes to one or more artifacts. An alternative characterization of a software configuration is that it consists of the set of change-sets that have resulted in that configuration.

A change-set is the mechanism that allows a software developer to determine what logical changes are in a given software configuration. Although in general a single change-set can include changes to multiple artifacts in a configuration (if multiple artifacts had to be modified to perform the logical change captured by that change-set), for the purposes of this invention, it is sufficient to consider the effect of a change-set on a single artifact in the configuration.

The standard data structure for capturing the changes to a software artifact is an artifact version history, which consists of a set of versions of that software artifact, connected by arcs that represent the change that was performed to produce one version of the artifact from a previous version of the artifact (or in the case of a merge, from multiple previous versions of the artifact).

Figure 1:
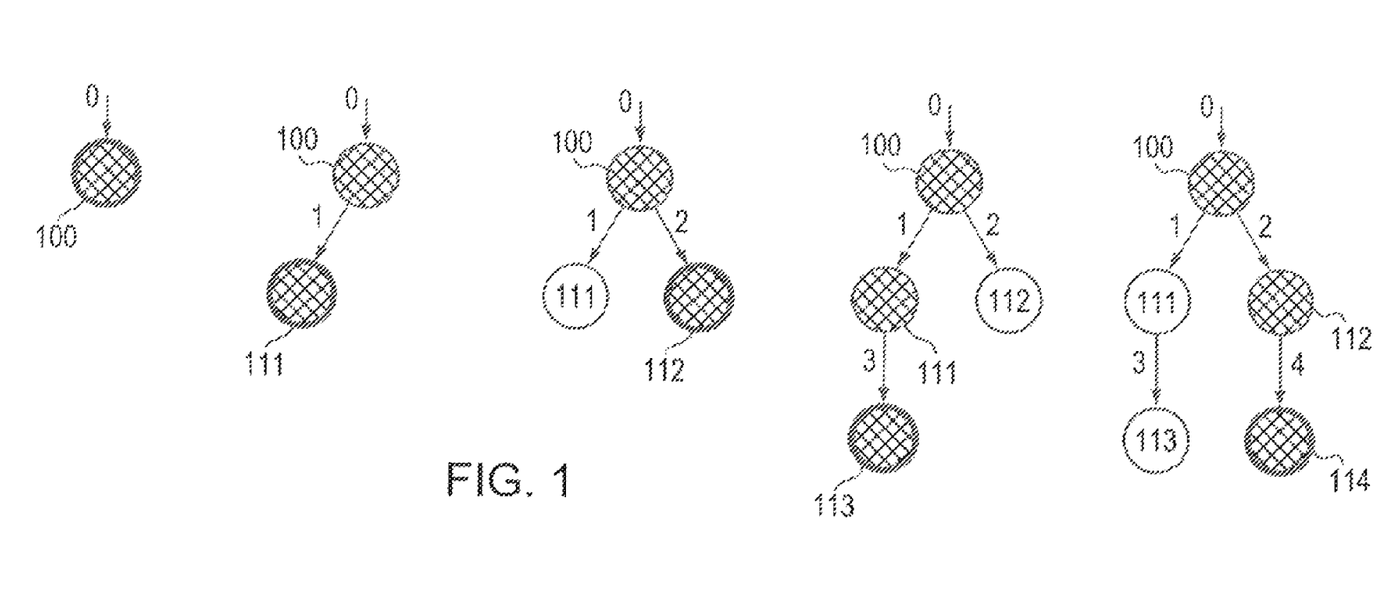
FIGS. 1 and 2 are schematic illustrations of artifact version histories in a typical configuration management system.

For example in FIG. 1, an initial version 100 (version 0) of the software artifact is created by the change labeled 0. Version 1 (at node 111) is created by performing change 1 on version 0 (at node 100), version 2 (node 112) is created by performing change 2 on version 0 (node 100). Version 3 (node 113) is created by performing change 3 on version 1 (node 111), and version 4 (node 114) is created by performing change 4 on version 2 (node 112).

Commonly, a user will want to logically merge all the changes from one version into another version. An example of this appears in FIG. 2, where version 5 (node 115) is the result of merging all of the changes that produced node 114 version 4 (i.e., change 0, change 2, and change 4) into version 3 (node 113).

Figure 2:
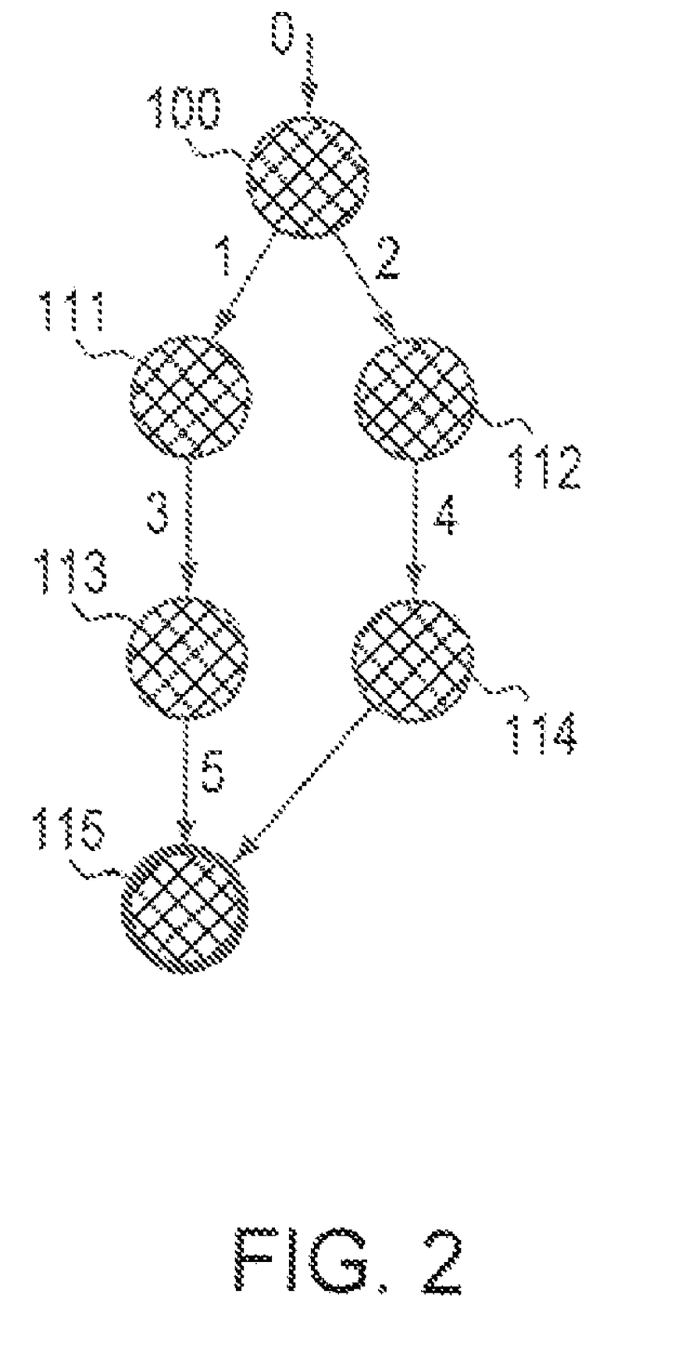

The result is that version 5 (node 115) logically contains the union of all of the changes 0, 1. 3 that produced version 3 (at node 113) with all of the changes 0, 2, 4 that produced version 4 (at node 114), in addition to the change (change 5) needed to resolve any conflicts between those changes.

To determine all of the logical changes that are contained by a given version, the configuration management system can simply enumerate the change that produced that version and all of the changes that produced a predecessor of an enumerated version. For example, the changes in version 3 (at 113) are change 3, change 1, and change 0, while the changes in version 5 (at 115) are change 5, change 3, change 4, change 1, change 2, and change 0.

In some cases, the user only wants to merge a particular logical change, and not all of the changes that have produced the version containing that logical change. For example, suppose in FIG. 2 that the user is interested in merging just change 4 (and not change 2) into version 3 (node 113). This is called a "selective merge".

In other cases, the user doesn't want to merge a set of changes into a given version, but instead wants to remove or undo a change that is currently in a given version. For example suppose the user is interested in removing change 1 from version 3 (node 113). This is called a "subtractive merge".

A problem that is introduced by a subtractive merge is how to handle the case where a user wants to merge all of the changes from a source version into a given target version, and the target version already contains a particular change, but that change has been explicitly removed from the source version by a subtractive merge. Should the result of the merge of the given source version into the given target version contain that change or not?

A mechanism is required to represent both selective and subtractive merges in an artifact version history, to detect when a merge produces an ambiguity as to whether a given change should be kept or omitted from the merge, and to represent how that ambiguity has been resolved. This mechanism must allow for efficient computation of what logical changes are present in any given version in an artifact version history.

SUMMARY OF THE INVENTION

The present invention addresses the problems of prior art. In particular, the present invention represents a selective merge of a given change into a new version by using a special selective merge arc added to the artifact version history. The added selective merge arc connects the version produced by the given change to the new version.

To represent a subtractive merge of a given change the present invention adds a special subtractive merge arc to the artifact version history, connecting the version produced by a given change to the new version that results from subtracting that change.

When a merge produces an ambiguity about whether a given change should be kept or omitted from the merge, the present invention provides a selective merge arc from the version produced by that change to the version produced by the merge. This selective merge arc indicates that the change should be kept in the merge, while a subtractive merge arc from the change to the version produced by the merge indicates that the change should be omitted in the merge.

In the preferred embodiment, method and apparatus for managing software configurations include:

using a version history member, representing changes between versions of artifacts forming different configurations of a subject software program, indicating in the version history member any selective merge between artifact versions; and indicating in the version history member any subtractive merge between artifact versions.

BRIEF DESCRIPTION OF THE DRAWINGS

The foregoing will be apparent from the following more particular description of example embodiments of the invention, as illustrated in the accompanying drawings in which like reference characters refer to the same pales throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 10:
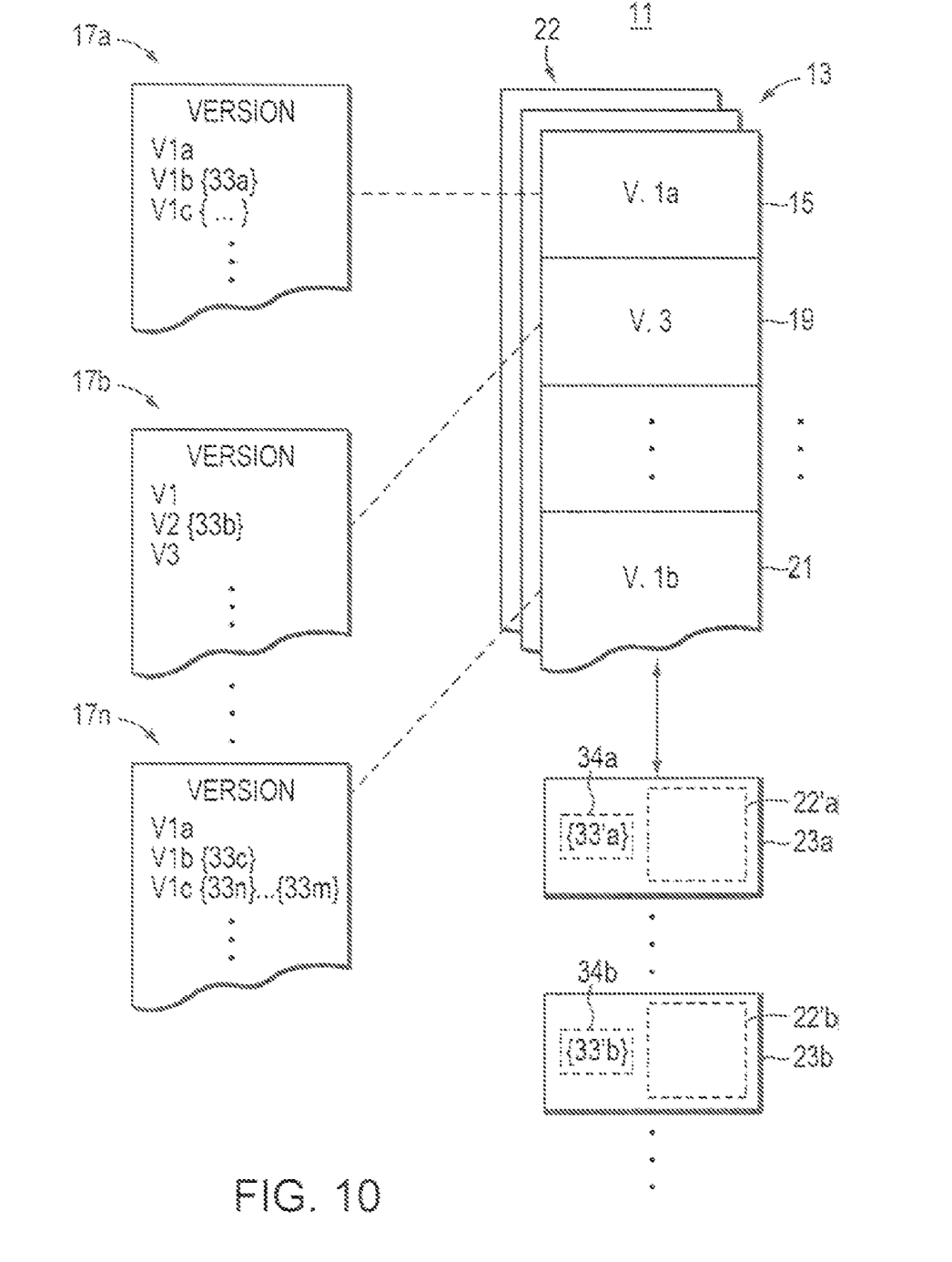
FIG. 10 is a block diagram of a configuration management system embodying the present invention.

Illustrated in FIG. 10 is a configuration management system 11 embodying the present invention. Configuration management system 11 provides a workspace view of a subject software program 13 and various information regarding the subject software program 13. The software program 13 is formed of one or more artifacts 15, 19, 21. Each artifact 15, 19, 21 has respective versions, e.g., V.1a, V.3, V1b, etc. Each configuration 22 of a subject software program 13 employs respective versions of the artifacts 15, 19, 21. One of the illustrated configurations 22 of subject software program 13 in FIG. 1 is formed of version V.1a of artifact 15, version V.3 of artifact 19 and version V.1b of artifact 21. Other configurations 22 of subject software program 13 use other versions of artifacts 15, 19, 21.

Information regarding the versions of an artifact 15, 19, 21 is stored in a respective version history table 17 of the artifact 15, 19, 21. In particular, change set information (the change set 33 to which a version belongs) is recorded in respective artifact version history table 17. FIG. 10 illustrates the one configuration 22 of subject software program 13 having version history table entry 17a for artifact 15, version history table entry 17b for artifact 19 and version history table entry 17n for artifact 21. It is understood that the configuration management system 11 stores the foregoing information for each configuration 22 of program 13. Further, version history 17 may be implemented as a table, log, other data structure and the like.

Configuration management system 11 enables users to produce and work with (edit, test, redesign, etc.) such different configurations 22 of subject software program 13. Each artifact 15, 19, 21 is a persistent result of work done by a user, typically persisted in a file system such as models and source code. An "activity" is used to track the results of work done by a user. The "change set" 33 of an activity is the set of changes to artifacts 15, 19, 21 made by the practitioner to perform the activity. A "workspace" 23 is used to define the work environment of a user—to contain the artifacts 15, 19, 21 required by that user and the change sets that track the results of performing those activities. The workspace 23 is said to "accept" the activity change sets that define the current or working configuration 22'.

Restated, all changes to software artifacts 15, 19, 21 are made in the context of a workspace 23a, b, c (generally 23). Each user or member of a team has a respective workspace 23 on respective client machines. Each workspace 23 identifies a respective change set 33' in an accepted set 34 that indicates or provides the logical change currently being performed to a configuration 22' of that workspace.

In accordance with the present invention, to represent a selective merge of a given change into a new version, a special selective merge arc is added to the artifact version history 17, connecting the version produced by the given change to the new version. To represent a subtractive merge of a given change, a special subtractive merge arc is added to the artifact version history 17, connecting the version produced by the given change to the new version that results from subtracting that change. When a merge produces an ambiguity about whether a given change should be kept or omitted from the merge, a selective merge arc from the version produced by that change to the version produced by the merge indicates that the change should be kept in the merge, while a subtractive merge arc from the change to the version produced by the merge indicates that the change should be omitted in the merge.

Figure 3:
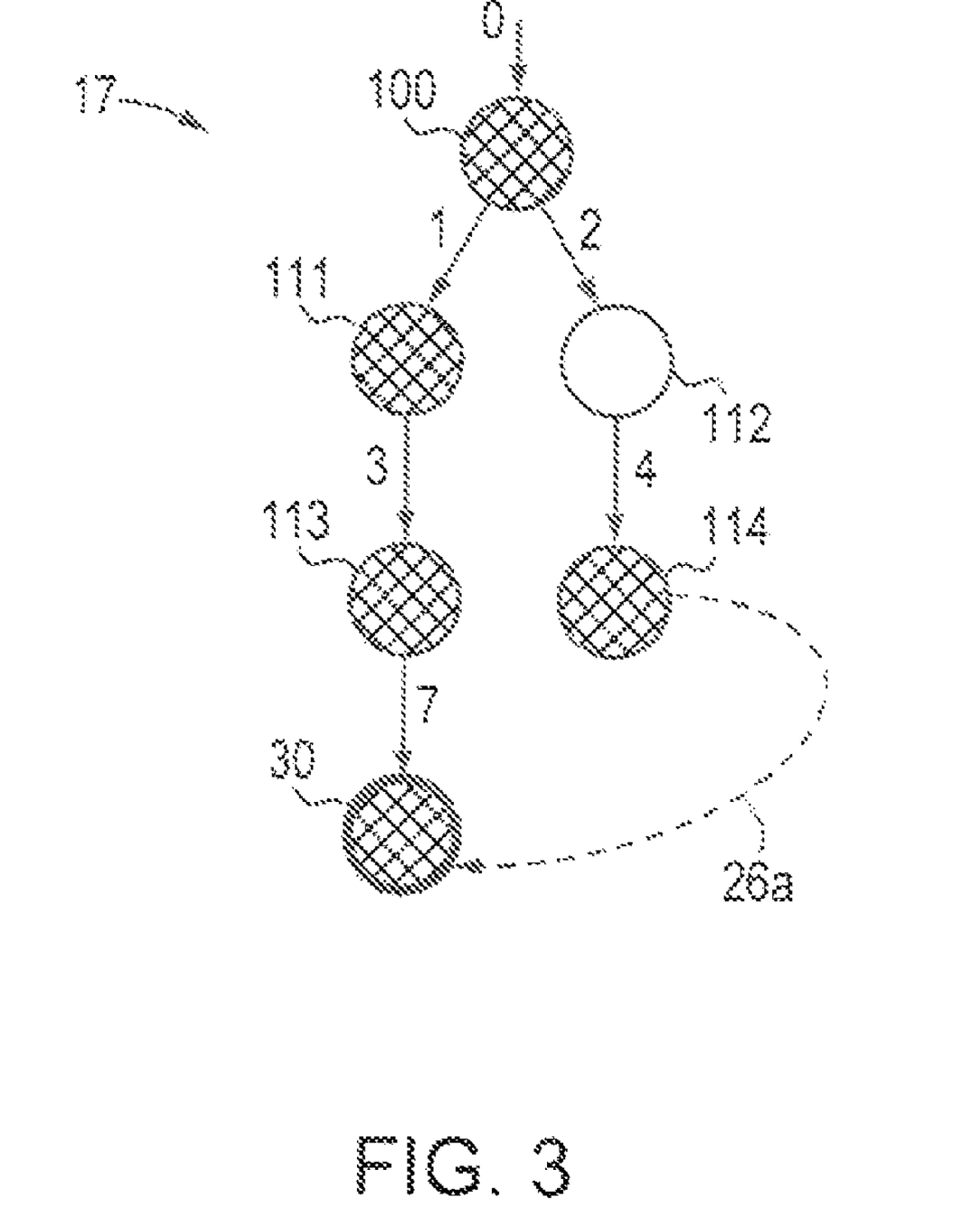
FIG. 3 is a schematic illustration of a selective merge arc in the artifact version history of a configuration management system embodying the present invention.

For an example of a selective merge, consider the artifact version history from FIG. 1. Suppose that change 4 (but not change 2) is selectively merged into version 3 (node 113). This is captured in the artifact version history 17 by creating a new version that is a successor of version 3 (node 113) and that has a selective merge arc 26a from the version 114 produced by change 4 to the new version 30 (see FIG. 3). The new version 30 then logically contains change 0, change 1, change 3, change 4, and change 7.

Figure 4:
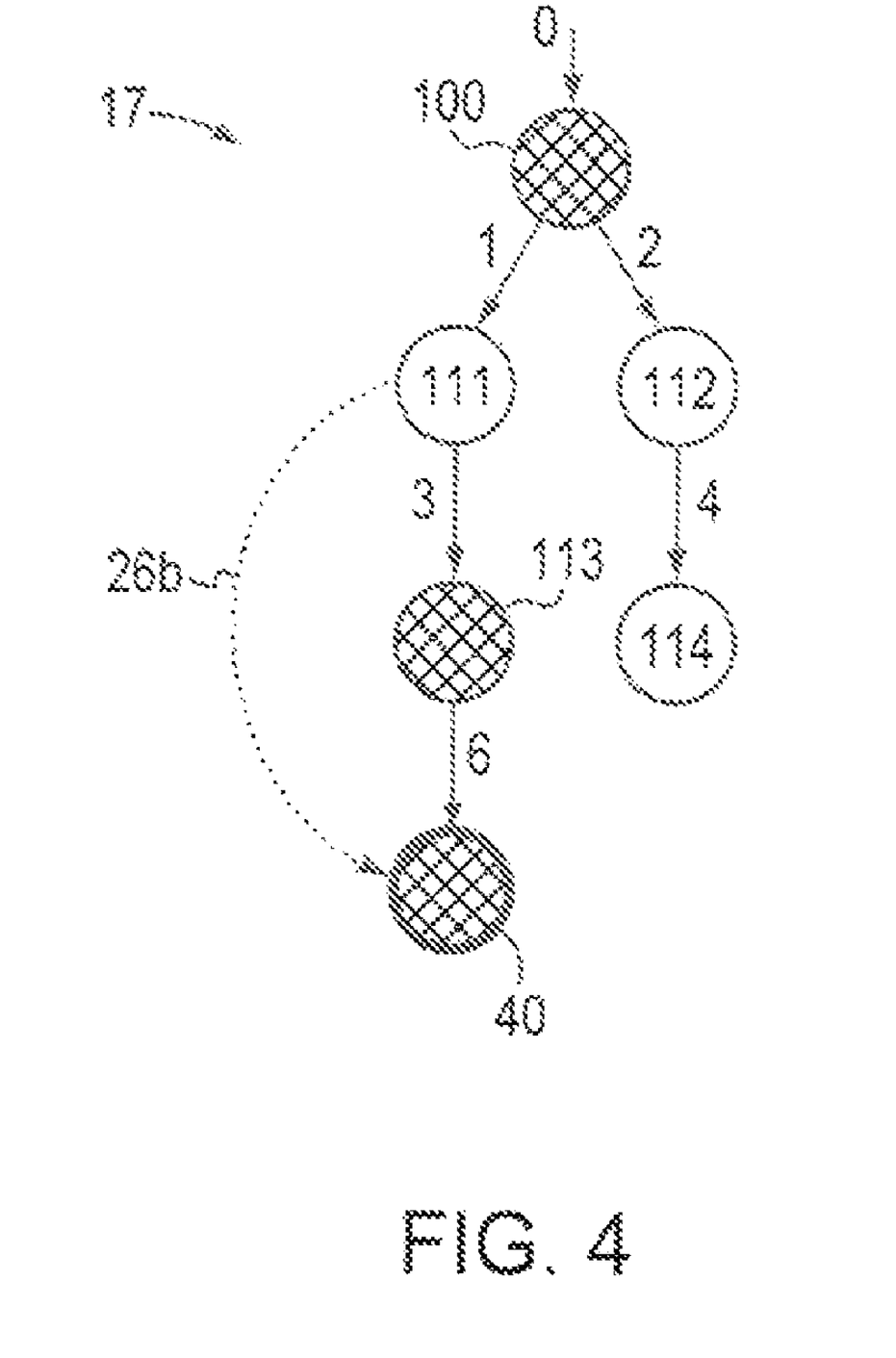
FIG. 4 is a schematic illustration of a subtractive merge in an artifact version history of a configuration management system embodying the present invention.

For an example of a subtractive merge, again consider the artifact version history from FIG. 1. Suppose that change 1 is subtractively merged from version 3 (node 113) This is captured in the artifact version history 17 by creating a new version that is a successor of version 3 (node 113) and that has a subtractive merge arc 26b from the version 111 produced by change I to the new version 40 (see FIG. 4). The new version 40 then logically contains change 0, change 3, and change 6.

Figure 5:
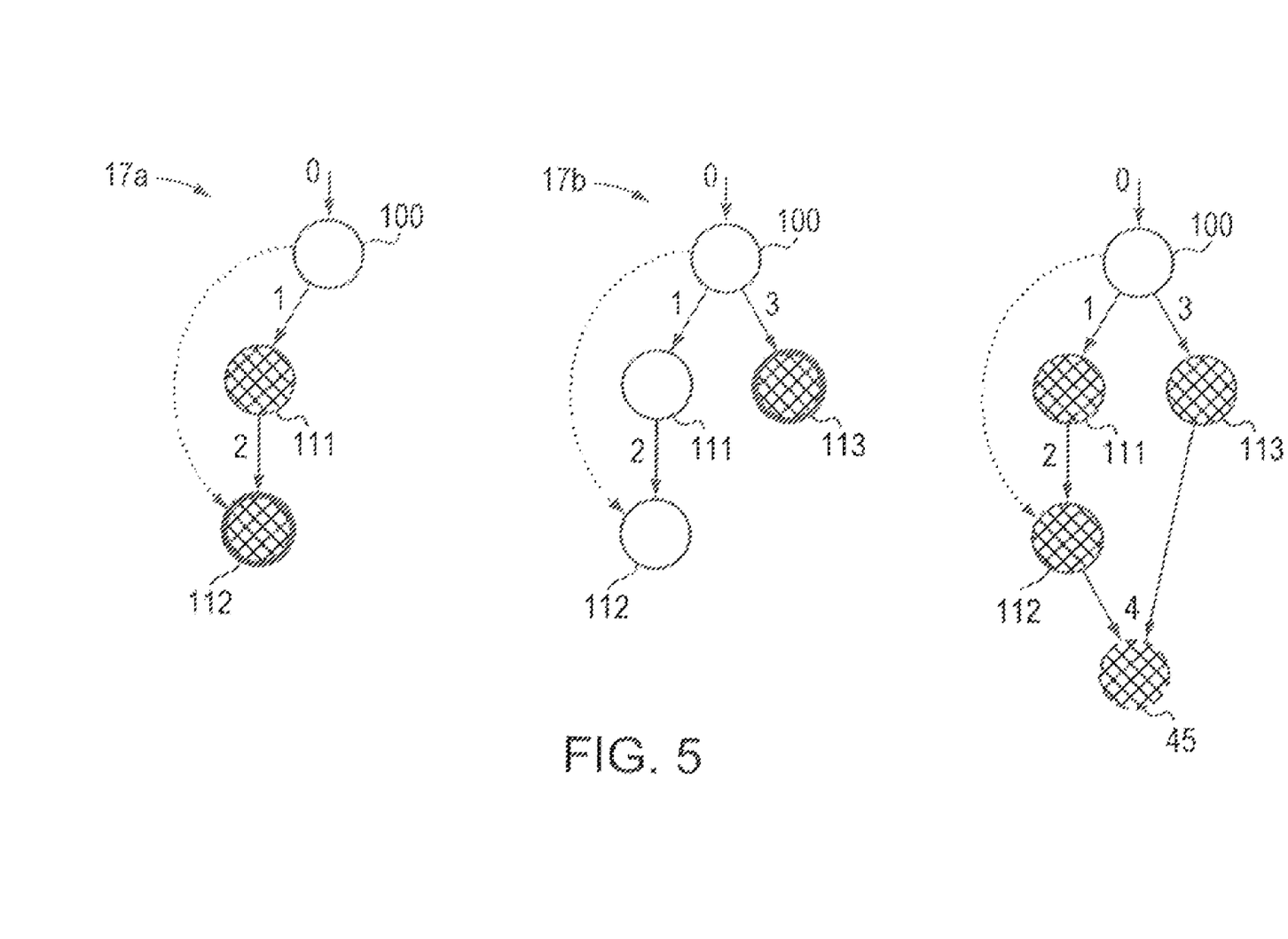
FIGS. 5-7 are schematic illustrations of an ambiguous merge provided by the present invention.

For an example of an ambiguous merge, see FIG. 5. In this artifact version history 17a, version 2 (node 112) is the result of subtracting change 0 from version 1 (node 111), while in version history 17b version 3 (node 113) is the result of change 0 and change 3. If version 3 (node 113) is merged into version 2 (node 112) illustrated to the right side in FIG. 5, it is ambiguous whether change 0 should be included in the new version 45 or not.

Figure 6:
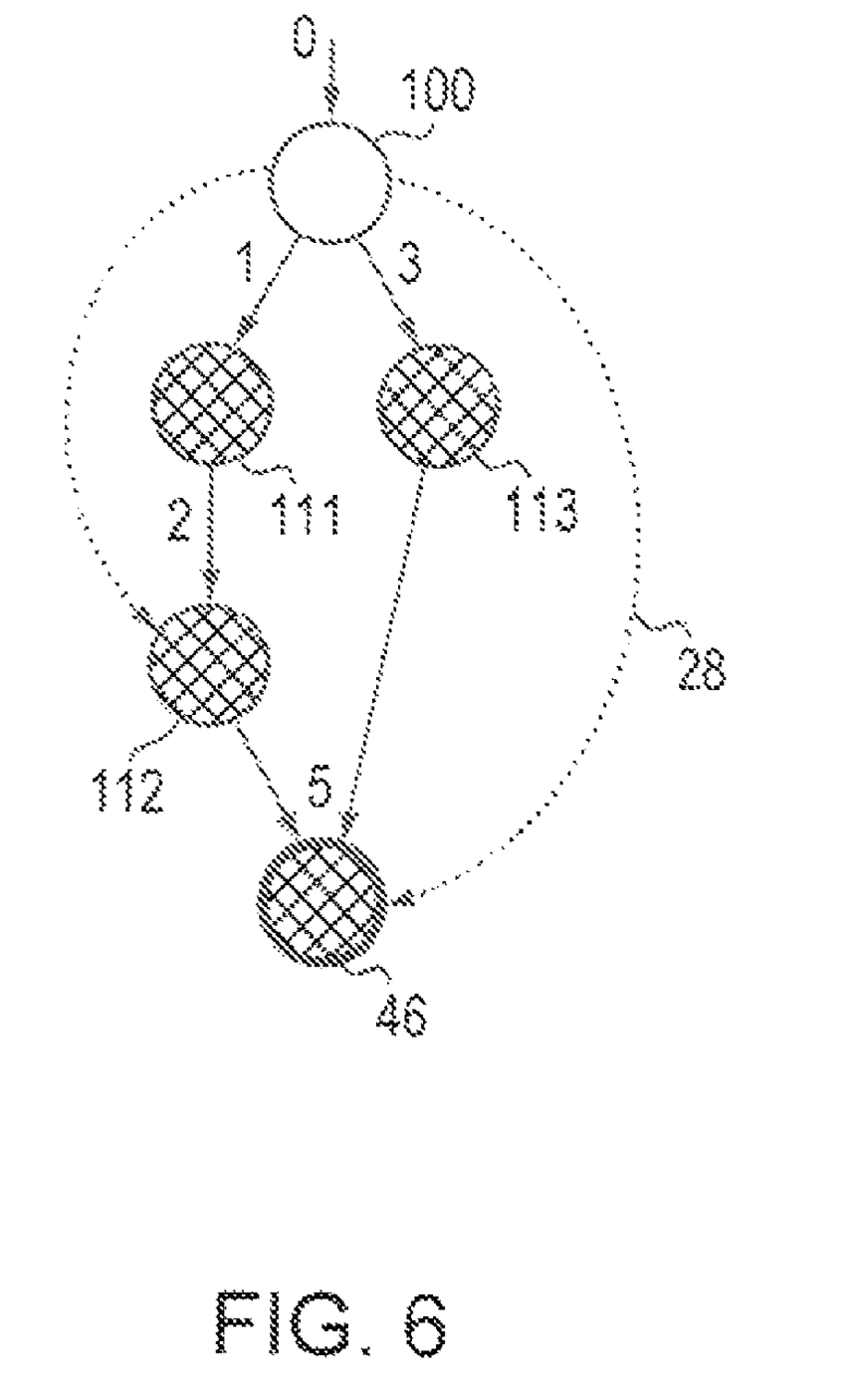

To resolve the ambiguity, the user must indicate whether to include change 0 in the merge. If change 0 is not to be included, a subtractive merge arc 28 is added from version 0 (node 100) to the new version 46 (see FIG. 6).

Figure 7:
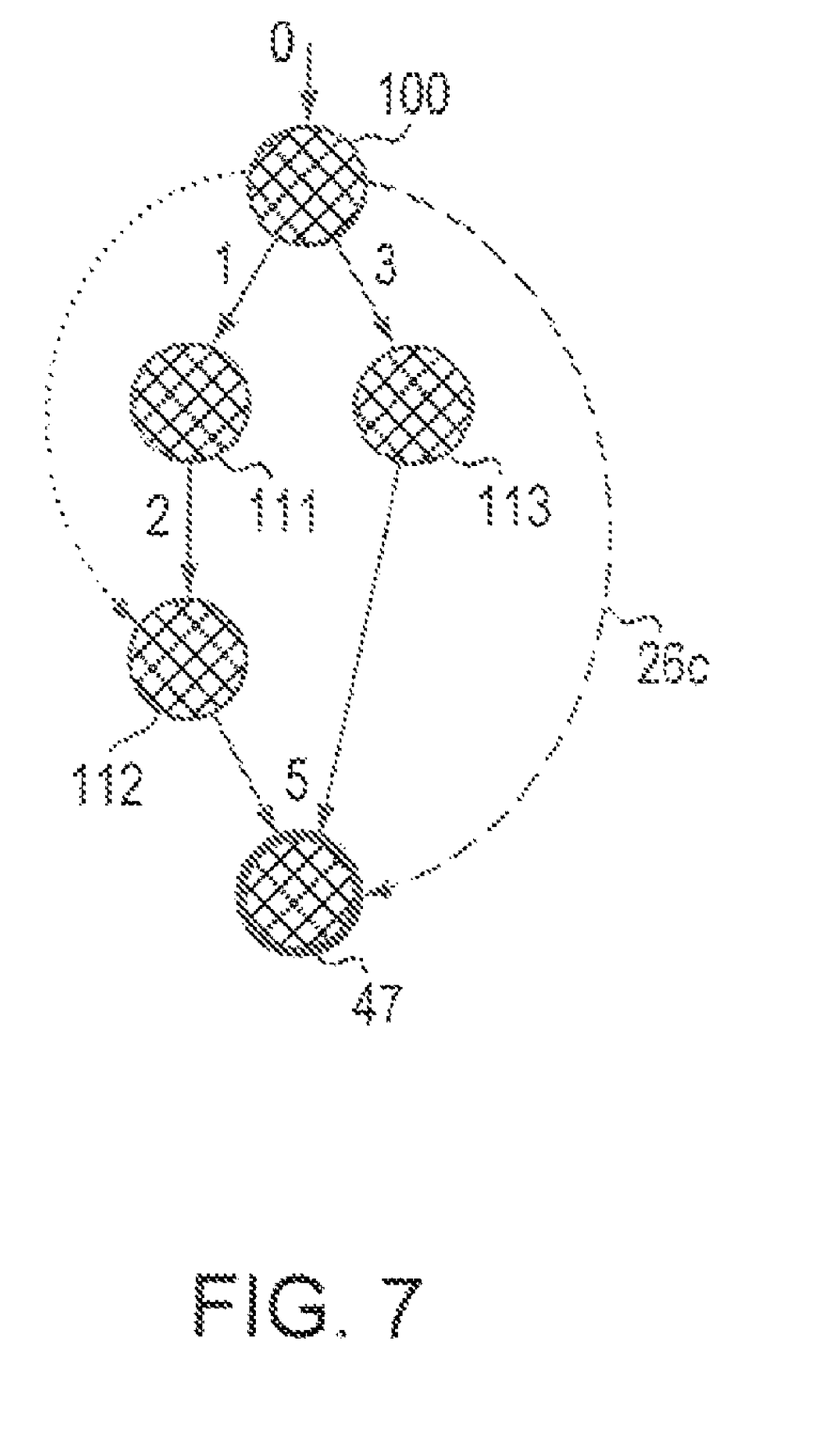

If change 0 is to be included, a selective merge arc 26c is added from version 0 (node 100) to the new version 47 (see FIG. 7).

The following algorithm can then be used to efficiently print out all changes in a version.

Version.all-versions: all versions in the artifact version history that contains Version.

Version.visited: a Boolean flag indicated whether Version has been visited by the visit( ) algorithm.

Version.marked: a property indicating whether Version has been explicitly included (ACCEPT), explicitly not included (REJECT), or neither (NULL).

Version.change-set: the change-set that contains the change that produced Version.

Version.predecessor-set: the set of all versions that have been merged to create Version.

Version contains all changes from each version in its predecessor-set.

Version.rejected-predecessor-set: The set of all versions for which there is a subtractive merge link to Version.

Version.accepted-predecessor-set: The set of all versions for which there is a selective merge link to Version.

```
print-changes(version) {
    foreach v in version.all-versions {
        v.visited = FALSE;
        v.marked = NULL; };
    visit(version);
    foreach v in version.all-versions {
        if(v.marked == ACCEPT) print(v.change-set); }; };
visit(version) {
    if (version.visited) return;
    version.visited = TRUE;
    if (version.marked == NULL) version.marked = ACCEPT;
    foreach rejected-version in version.rejected-predecessor-set {
        if(rejected-version.marked == NULL) rejected-version.marked = REJECT; }
    foreach accepted-version in version.accepted-predecessor-set {
        if(accepted-version.marked == NULL) accepted-version.marked = ACCEPT; }
    foreach predecessor-version in version.predecessor-set {
        visit(predecessor-version); }; }
```

Figure 8:
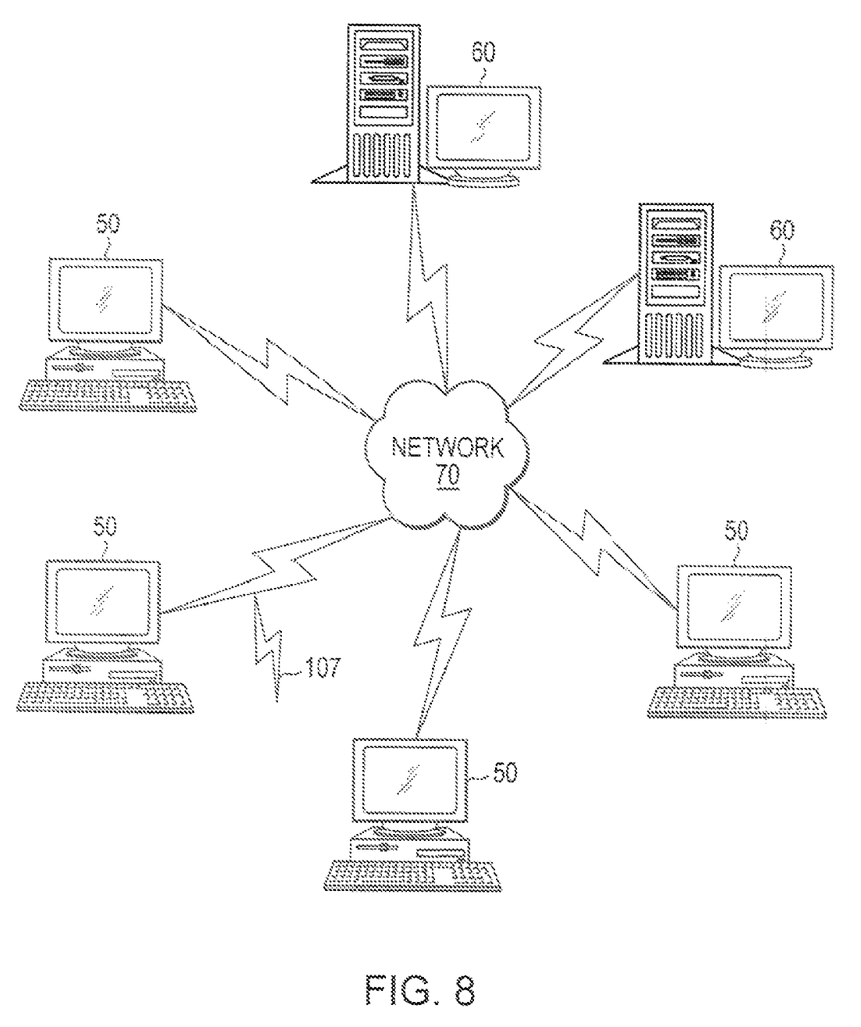
FIG. 8 is a schematic view of a computer network in which embodiments of the present invention are operated.

FIG. 8 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
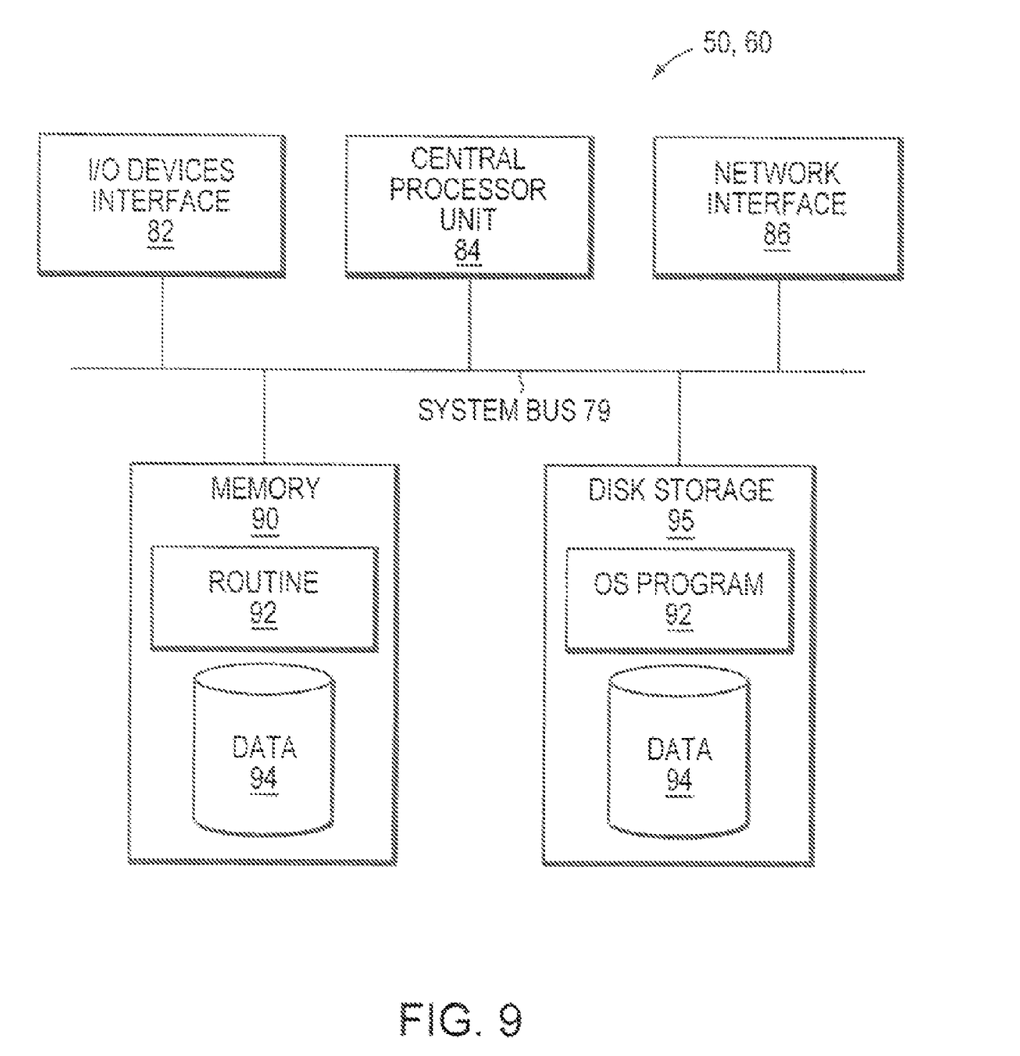
FIG. 9 is a block diagram of a computer node in the network of FIG. 8.

FIG. 9 is a diagram of the internal structure of a computer (e.g., client processor/device 50 or server computers 60) in the computer system of FIG. 8. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 90 provides volatile storage for computer software instructions 92 and data 94 used to implement an embodiment of the present invention (e.g., version history table 17, selective merge arcs 26, subtractive merge arcs 28 and corresponding operations detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing software configurations comprising the steps of:
    using a version history member, representing changes between versions of artifacts forming different configurations of a subject software program;
    indicating in the version history member any selective merge between artifact versions, including for each selective merge of a given change into a new artifact version, employing a respective selective merge arc between an indication of an artifact version produced by the given change and an indication of the new artifact version; and
    indicating in the version history member any subtractive merge between artifact versions, including for each subtractive merge of a given change, employing a respective subtractive merge arc between an indication of an artifact version produced by the given change and an indication of a new artifact version that results from subtracting the given change; and
    wherein each selective merge arc indicates that the given change should be kept in the respective selective merge, and wherein each subtractive merge arc indicates that the given change should be omitted in the respective subtractive merge.

2. A method as claimed in claim 1 wherein the version history member is any of a table and a log.

3. A method as claimed in claim 1 wherein the steps are performed using a digital processor, there being one or more different configurations of the subject software program, each having a respective version history.

4. Computer apparatus comprising computer readable-storage medium containing instructions for managing software configurations comprising:
    an artifact version history member representing changes between versions of artifacts forming different configurations of a subject software program;
    a selective merge indicator for representing a selective merge between artifact versions in the artifact version history member, wherein the selective merge indicator is a selective merge arc between an indication of an artifact version produced by the given change and an indication of a new artifact version; and
    a subtractive merge indicator for representing a subtractive merge between artifact versions in the artifact version history member, wherein the subtractive merge indicator is a subtractive merge arc, for each subtractive merge of a given change, there being a respective subtractive merge arc between an indication of an artifact version produced by the given change and an indication of a new artifact version that results from subtracting the given change; and
        wherein the selective merge arc indicates that the given change should be kept in the selective merge, and wherein the subtractive merge arc indicates that the given change should be omitted in the subtractive merge.

5. Computer apparatus as claimed in claim 4 wherein the version history member is any of a table and a log.

6. A computer system for managing software configurations comprising:
    a processor;
    artifact version history means for representing changes between versions of artifacts forming different configurations of a subject software program;
    selective merge indicator means for representing a selective merge between artifact versions in the artifact version history member, wherein the selective merge indicator means includes an arc between an indication of an artifact version produced by a given change and an indication of a new artifact version resulting from a selective merge of the given change; and
    subtractive merge indicator means for representing a subtractive merge between artifact versions in the artifact version history member, wherein the subtractive merge indicator means includes an arc between an indication of an artifact version produced by the given change and an indication of a new artifact version that results from subtracting the given change; and
        wherein the arc of the selective merge indicator means indicates that the given change should be kept in the selective merge, and wherein the arc of the subtractive merge indicator means indicates that the given change should be omitted in the subtractive merge.

7. A system as claimed in claim 6 wherein the artifact version history means utilizes any of a table and a log.

8. A computer program product comprising a computer readable storage medium having a computer readable program, wherein the computer readable program when executed on a computer causes the computer to:

represent changes between versions of artifacts forming different configurations of a subject software program;

indicate among the represented changes any selective merge between artifact versions, including employing a selective merge are to represent selective merges; and indicate among the represented changes any subtractive merge between artifact versions, including employing a respective subtractive merge arc to represent subtractive merges, wherein the selective merge arc indicates that a given change should be kept in the respective selective merge, and wherein the respective subtractive merge arc indicates that a given change should be omitted in the respective subtractive merge.

9. A computer program product as claimed in claim 8 wherein the computer readable program when executed on a computer causes the computer to represent changes in a version history.

* * * * *